United States Patent [19]

Verber

[11] Patent Number: 5,172,258

[45] Date of Patent: Dec. 15, 1992

[54] METHOD AND APPARATUS FOR HIGH DATA RATE FIBER OPTIC COMMUNICATION SYSTEM

[75] Inventor: Carl M. Verber, Atlanta, Ga.

[73] Assignee: Georgia Tech Research Corporation, Atlanta, Ga.

[21] Appl. No.: 517,367

[22] Filed: May 1, 1990

[51] Int. Cl.⁵ .................. H04J 14/08; G02B 6/10
[52] U.S. Cl. .................... 359/138; 359/117; 385/132; 341/14
[58] Field of Search .............. 359/138, 139, 170, 173, 359/179, 188, 195, 117; 385/1, 2, 122, 129, 132, 24, 18, 16; 341/14, 137; 364/822, 714

[56] References Cited

U.S. PATENT DOCUMENTS

4,961,621 10/1990 Su ............................................ 385/16
5,032,010 7/1991 Su ............................................ 385/24

Primary Examiner—Edward L. Coles, Sr.
Assistant Examiner—Kinfe-Michael Negash
Attorney, Agent, or Firm—Hurt, Richardson, Garner, Todd & Cadenhead

[57] ABSTRACT

A method and apparatus for performing optical serial-to-parallel conversion of an optical data pulse stream having a multiplicity of data pulses, wherein the data pulse stream is formatted into a series of data pulses and an associated timing pulse which is out of phase with the data pulses, the data pulses are propagated along a forward path in a waveguide, the timing pulse is counter-propagated and collided with the data pulses thereby producing second harmonic generation from the collision, and the pulses travelling perpendicularly to the forward path are collected at a plurality of locations along the forward path to produce a parallel output.

25 Claims, 8 Drawing Sheets

METHOD AND APPARATUS FOR HIGH DATA RATE FIBER OPTIC COMMUNICATION SYSTEM

BACKGROUND OF THE INVENTION

A. Field of the Invention

The present invention relates to a method and apparatus for performing optical serial-to-parallel conversion. In particular, the present invention uses second harmonic generation to perform high-speed optical time domain demultiplexing and optical code recognition.

B. Description of Related Art

During the past decade, fiber optic communication technology has been developed and commercialized at virtually unprecedented rates. Current long-haul systems operate at data rates up to 1.7 GB/s. Plans call for the introduction of 2.4 GB/s long-haul systems in the near future and rates of up to 10 GB/s are being demonstrated. For systems with shorter fiber spans, such as local-area and metropolitan-area networks, there is no fundamental reason why fibers cannot support data rates which exceed these rates by at least two orders of magnitude. In fact, it can be shown that, for transmission links on the order of kilometers, commercially available fibers can support data rates exceeding 100 GB/s on a single optical carrier in the 1.3 micrometer wavelength range without resorting to operation at exactly the zero-dispersion wavelength. However, at these data rates, electronic components are unable to generate, interpret or switch the data.

In view of the speed limitations of electronics, it is evident that, to implement high speed communication systems, it is necessary to have a high-speed optical signal processing technology to compliment the high-speed optical-transmission technology. In addition, new system concepts which are compatible with the higher data rates and with the optical hardware must be developed.

One concept of interest to researchers attempting to develop hardware to mate electrical and optical signal processing is second harmonic generation (SHG) and waveguide SHG in particular. Investigators Normandin and Stegeman have authored a number of papers detailing the occurrence of waveguide SHG. See for examples, R. Normandin and G. I. Stegeman, *Non-Degenerate Four-Wave Mixing in Integrated Optics*, Optics Letters, Vol. 4, No. 2, February 1979; *Picosecond Signal Physics Letters*, 36(4) Feb. 15, 1980; and P. J. Vella, R. Normandin, and G. I. Stegeman, *Enhanced Second-Harmonic Generation by Counter-Propagating Guided Optical Waves*, Applied Physics Letters 38(10) May 15, 1981. Normandin and Stegeman demonstrated waveguide SHG in strongly non-linear optical materials by inserting an optical pulse at one end of the waveguide and another optical pulse at the other end of the waveguide. When the two injected signals collided, they produced a second harmonic wave which propagated perpendicular to the waveguide surface.

SUMMARY OF THE INVENTION

The present invention allows the use of high speed optical transmission lines by converting parallel optical digital signals from serial optical digital signals. The present invention is typically includes an electrooptical tapped delay line. The tapped delay line is formed using a series of beam splitters to split a single input pulse into a series of pulses, each of which follows a successively longer path before entering a common output channel. By introducing a switch in each pulse path, any subset of pulses may be rejected from the output channel so arbitrary temporal output pulses can be formed. Each optical switch is electronically controlled by the output of a specific electronic data channel.

Alternatively, the tapped delay of the present invention may be used as an arbitrary code generator. Each electrooptical switch is turned on or off according to the word to be generated. Whether used as a multiplexer or a code generator, the output of the tapped delay line is an optical serial bit stream transmitted through optical fibers. At the opposite of the transmission system, apparatus of the present invention is used to reconvert the optical data into electronic data.

A unique feature of the tapped delay line is its ability to insert a timing Pulse into the outgoing epoch of data. This timing pulse may precede or lag the data epoch by a time T, where:

$T = (n + \frac{1}{2})t$ and

T = the time by which the timing pulse precedes or lags an epoch of data t = the spacing in time between adjacent data bits in a serial data pulse stream n = any integer (... −1,0,1...)

The timing pulse preferably leads the data stream and contains half the energy of the epoch for reasons that will be discussed hereinbelow.

The present invention uses waveguide SHG to convert high-speed optical data rates to lower data rates compatible with conventional high-speed electronic signal-processing. The use of waveguide SHG also allows the present invention to operate asynchronously thereby greatly reducing the circuit complexity as compared to conventional electronic methods of time demultiplexing or code recognition.

The optical serial-to-parallel converter of the present invention includes a waveguide fashioned from a strongly nonlinear optical material. One end of the waveguide is mirrored so that signals injected at the opposite waveguide end are reflected and counter-propagated back toward the waveguide input.

The serial-to-parallel to parallel converter generates second harmonics by colliding the data stream with the single timing pulse. As currently conceived, half of the energy of the initial optical pulse is in the timing pulse, with the remainder divided equally among the data pulses. When the timing pulse reflects at the mirrored end of the waveguide it gives off a large amount of energy which is distinguishable from the reflection of data pulses, and thus may be used as a trigger for other operations. Because the timing pulse is generated by the tapped delay line, the serial-to-parallel converter of the present invention operates asynchronously, and is therefore much less complicated than it would otherwise be.

The collision between the timing pulse and each data pulse in the serial data pulse stream occurs at a predetermined, unique location in the waveguide. Thus, the present invention derives each parallel output channel by placing a fiber optic array or a detector array on the waveguide perpendicular to the waveguide's longitudinal axis, with each fiber placed directly above a location where a timing pulse-data pulse collision or second harmonic should occur.

One application of the serial-to-parallel converter of the present invention is Time Doma, in Demultiplexing. Where the input to the converter is a time domain multiplexed (TDM) data stream comprised of a series of data frames, each data frame constituting one epoch of a TDM bit sequence, then each of the parallel output channels will carry demultiplexed data from the single input channel.

In a second application, the apparatus of the Present invention may be modified to perform optical code recognition. First, the fiber optic array is fed through an array of programmable fiber optic switches. These do not have to be fast switches. For demonstrative Purposes mechanical shutters will suffice. For field devices, mechanical fiber switches or an integrated optic switch array would be more appropriate. The array output is fed to a lens which spatially sums the individual outputs and directs it to an electrooptical detector.

Optical code recognition is performed by setting the switch array according to the bit sequence in an N-bit codeword, $C_N$, and injecting a signal $S_N$ into the waveguide. When the N-bit signal, $S_N$, is incident on the device, the output of the integrating detector is proportional to the scalar product of $C_N$ and $S_N$ when the two quantities are expressed as N-dimensional vectors with binary components. This quantity is a maximum when $C_N$ and $S_N$ are identical. In this way, the recognition function is performed with the detector and threshold device operating at the frame rate rather than at the data rate, as is required with the usual correlation operation.

Accordingly, it is an object of the present invention to provide a serial-to-parallel converter for high speed optical pulse sequences.

It is another object of the present invention to provide an apparatus to perform high-speed optical time domain demultiplexing.

It is yet another object of the present invention to provide an apparatus for performing optical code recognition.

It is a further object of the present invention to provide a method of performing optical code recognition at the data frame rate rather than at the data bit rate.

It is still another object of the present invention to provide an apparatus for providing high-speed demultiplexing without the use of any electronic components and without the use of any electrically-driven optical components.

It is yet a further object of the present invention to provide a method of performing high-speed time domain demultiplexing which will allow the use of current fiber optical transmission means at near capacity with current high-speed electronic signal processing technology.

It is yet another object of the present invention to provide a method performing optical code recognition which allows use of the high-speed capabilities of optical fibers in cooperation with lower speed capabilities of electronic signal processing. Incorporating this device in a code-division multiple access (CDMA) network allows the excess fiber band width to be used for network management in a way which is completely transparent to the electronic users.

BRIEF DESCRIPTION OF THE DRAWINGS

FIG. 2b is a schematic diagram, showing additional elements necessary to generate a timing pulse from the circuit of FIG. 2a.

FIGS. 5a-5b are diagrams for analyzing the diffraction in a uniaxial medium;

FIGS. 9a-9g are a series of timing diagrams showing the spatial separation of the coincidence of the data pulses and the counter-propagating timing pulse and the coincidences among data pulses in the operation of the converter of the present invention.

DETAILED DESCRIPTION OF THE INVENTION

Turning now to the figures, in which like numerals denote like parts, a preferred embodiment of the present invention may be seen.

Figure 1:
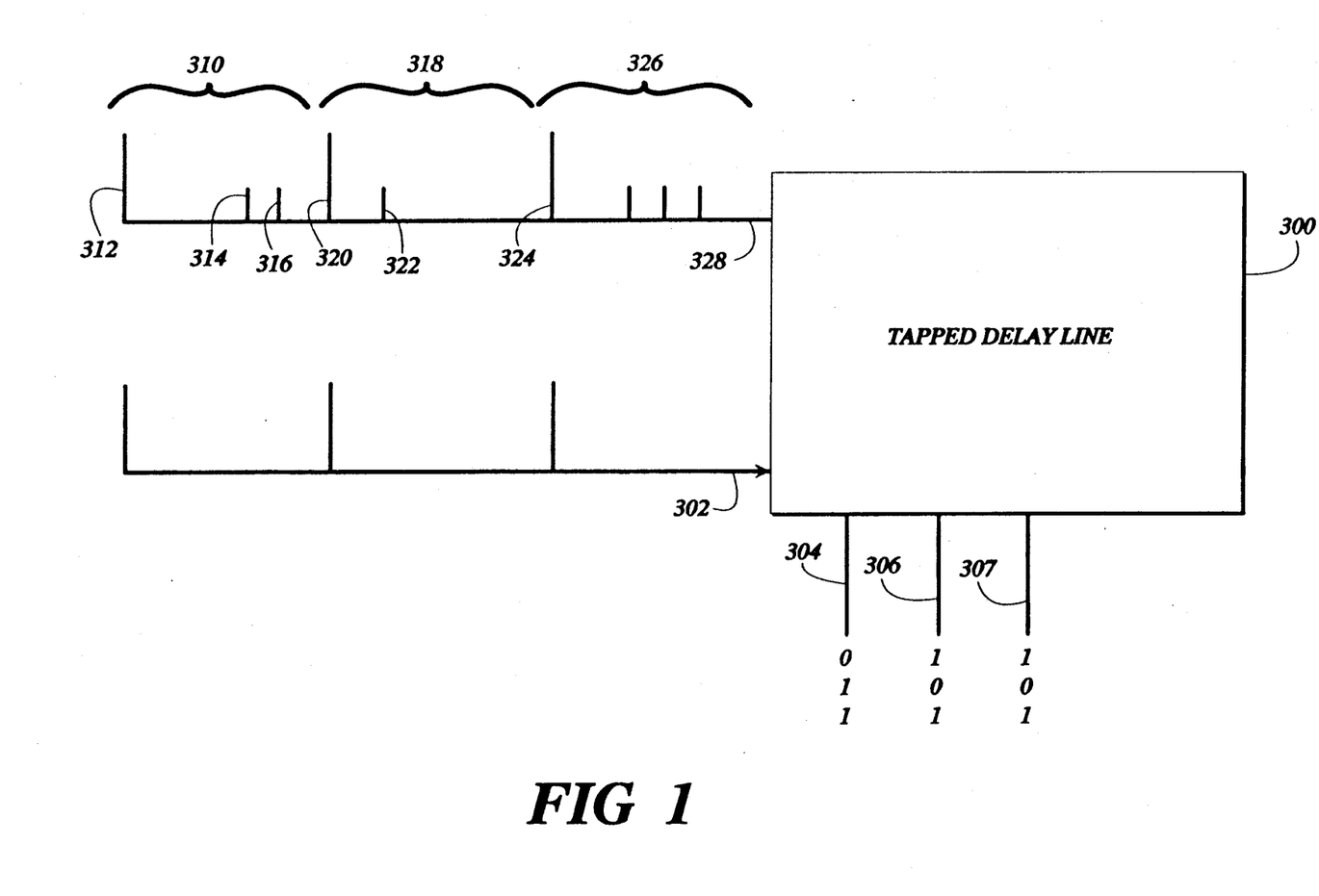
FIG. 1 is a block diagram illustrating the operation of the tapped delay line of the present invention.

Turning now to FIG. 1, the use of the tapped delay line of the present invention may be seen in operation as a time multiplexer. The tapped delay line 300 has an optical input 302, for each epoch of data to be output on output line 328, an optical pulse is strobed into the tapped delay line 300. The number of optical pulses which appear on output line 328 for each epoch of data depends upon the setting of the controls to the switches, with the maximum number of pulses per epoch equal to the number of bits per epoch plus one, to account for the timing pulse associated with each epoch of data.

When operated as a multiplexer each electronic switch control line 304, 306, and 308 represents an individual data channel. When the input to control lines 304, 306, and 308 is [011] the first epoch of data 310 on output line 328 will be [011], where a zero is indicated optically by the lack of an optical pulse, and a one by a pulse. The data bits in epoch 310 are preceded by timing pulse 312, which has twice the intensity of any of the data bits, 314 or 316, and preferably but not necessarily, is spaced apart from the first bit by 1.5t, where t equals the spacing between adjacent data bits. Each optical bit preferably is equally spaced from the adjacent data bit, be it a one or a zero. The second epoch of data 318 on output line 328 is a single high pulse 322 at the beginning of the epoch because the sole high electrical signal was applied to data control line 304. The third epoch of data 326 on output line 328 contains three optical pulses because three high electrical signals were applied to control lines 304, 306, and 308.

The tapped delay line 300 of the present invention operates exactly the same when used as a code generator. The sole difference between operation as a code generator as opposed to a data multiplexer, is that control lines 304, 306, and 308 would be operated by a controller, rather than by individual data channels.

Figure 2A:
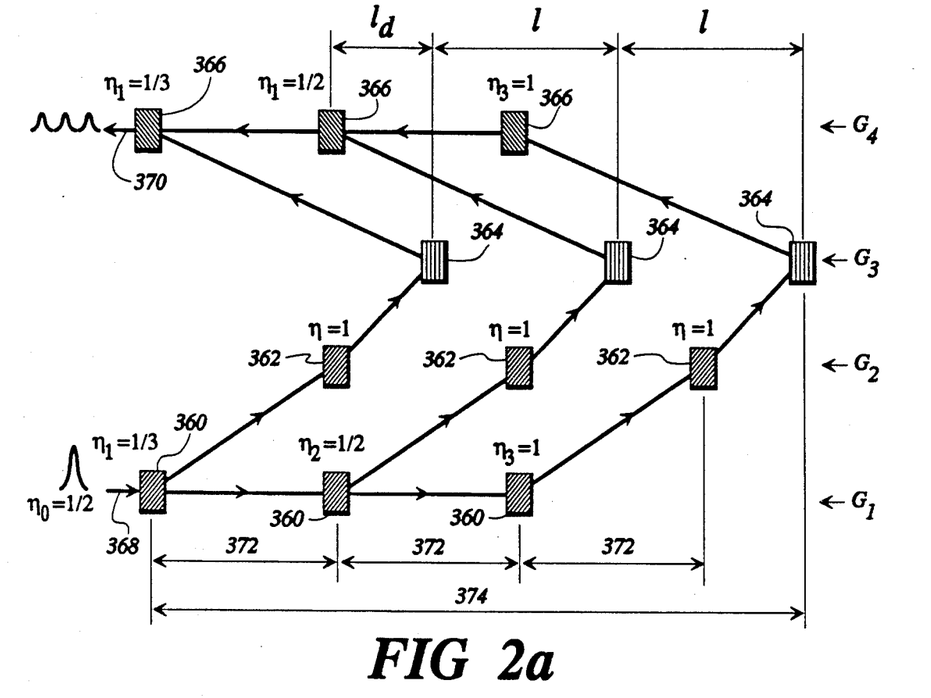
FIG. 2a is a schematic of a 3 bit planar integrated optic tapped delay line for lower output pulse rates.
Figure 3:
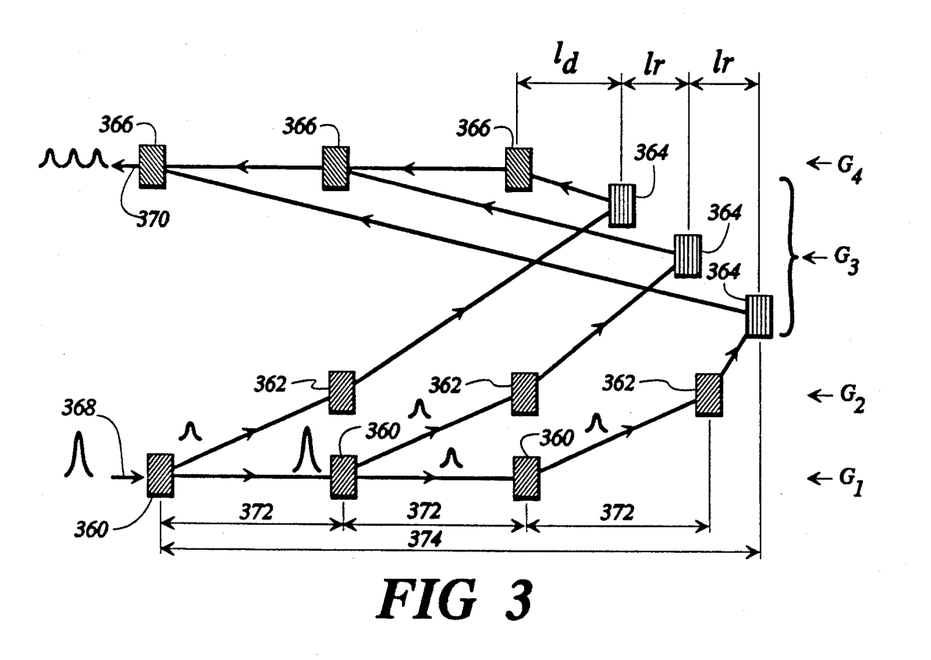
FIG. 3 is a schematic of a 3 bit planar integrated optic tapped delay line for higher output pulse rates.
Figure 4:
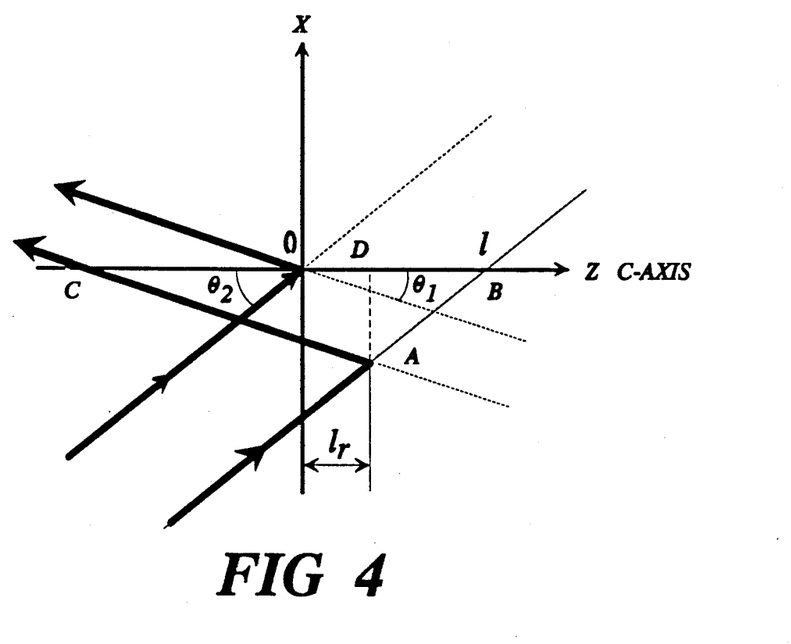
FIG. 4 illustrates output angles for switch gratings.

Turning now to FIGS. 2a and 3, detailed schematics may be seen of the composition of the planar integrated optic tapped delay lines used for optical code generation and time multiplexing. These tapped delay lines are composed of an array of electrooptic and fixed diffraction gratings fabricated on planar, single-mode, Ti-indiffused lithium niobate waveguides. The data rates and the number of bits which can be handled by a single delay line are limited by the size of available lithium niobate substrates, lithographic resolution and diffraction considerations. Two different designs, shown in FIGS. 2a and 3, lead to two different operational ranges. A low frequency range in the three to eight bit sequences can be generated in the range of 2.3 to 19GB/S, shown in FIG. 2a. The high-frequency design which can operate from 100 GB/S to over 1000 GB/S, can be seen in FIG. 3.

Each of the tapped delay lines shown in FIGS. 2a and 3 is formed by using a series of beam splitters to split a single input pulse 368 into a series of output pulses each of which follows a successively longer path before entering a common output channel 370. The introduction of a switch in each of the pulse paths allows any subset of pulses to be rejected from the output channel 370 so that arbitrary temporal output pulse sequences can be formed.

In both FIGS. 2a and 3, the lower set of devices 360 are electrooptical gratings which function as beam splitters. The function of these beam splitters is to divide the input pulse 368 into N equal intensity subpulses.

The second set of devices 362 shown in FIGS. 2a and 3, are gratings which function as switches having a nominal diffraction efficiency of 0% or 100%. When a voltage is applied to a switch grating 362 the grating 362 will diffract all of the power of the input pulse into the Bragg-angle direction for the next optic device, and keep that subpulse in the output pulse stream. If the switch 362 is not energized, the pulse will pass straight through and will miss the Bragg-angle of the third grating 364, so that the subpulse in the channel will not be directed toward the output.

The third set of gratings 364 function as fixed mirrors. Since they are used almost in retroreflection, they have a submicron period and must be fabricated holographically. The fourth set of gratings are electrooptic gratings 366 which combine the subpulses into a single output path. Their diffraction efficiencies are adjusted to be the same as the corresponding electrooptic gratings 360 in the first set to maintain equal output pulse amplitudes.

The first and fourth set of gratings are mirror images of each other. The path difference of FIG. 2a is twice the electrooptic grating separation distance. Since each diffractive beam must clear the following beam splitter, the minimum value of the grating separation distance is determined by the diffraction angle and the beam width. The diffraction angle is determined by the lithography limitation which we chose as one micron, and the minimum beam width is determined by beam divergence considerations. This structure cannot produce an ultra high speed output pulse sequence since the minimum grating separation in lithium niobate is about 3.56 mm which corresponds to a 19GB/S data rate.

In contrast to the structure of FIG. 2a, the path difference in FIG. 3 is twice the reflection grating offset distance, which can be arbitrarily small. Therefore, very high frequency output pulse sequence can be generated by this configuration. In addition to the output pulse frequency, the maximum channel number is an important factor. For the high speed device FIG. 3 this number does not depend on the output sequence rate, but on the physical dimension of the lithium niobate crystal substrate and on the lithography and diffraction limitation which determine the minimum electrooptic grating separation. For a three-inch diameter lithium niobate substrate, at most 16 channels can be accommodated on a single device.

Both of the designs shown in FIGS. 2a and 3 throw away the light associated with each time slice in which there is a binary zero. This is particularly important if sparse codes are to be used since these codes distribute a small number of ones among a large number of time slots. It is possible to eliminate this problem by removing the switch gratings 362 from the designs shown in FIGS. 2 and 3 and incorporating their function into beam splitters 360. This also simplifies fabrication, but it implies an increased computational load and rapid analog control of the voltages on the beam-splitting and recombining gratings.

For the designs of FIGS. 2a and 3, the weights of the beam-splitting and recombining gratings are permanently set according to equation 1:

$$\eta_k = \frac{1}{N - k + 1} \quad k = 1, 2, \ldots, N; \tag{1}$$

where k is the ordinal number of a subpath counted from the input side, and N is the total number of subpaths. For example, for the output pulse sequence (1,0,1) in FIG. 2a the efficiency of the electrooptic beam splitter gratings 360 are set to ($\frac{1}{3}$, $\frac{1}{2}$, 1); the efficiency of the switch gratings 362 are set to (1,0,1); and the energy of each output pulse will be one-ninth of that of the input pulse. In general, the maximum energy of each output pulse $E_o/N^2$ for this structure where $E_o$ is the input pulse energy and N is the length of the code.

OPTIMUM BEAM WAIST AND MINIMUM ELECTRO-OPTIC GRATING SEPARATION

The number of bits that can be accommodated on a single chip is determined principally by the electrooptic grating separation $\iota$, 372. Assuming a Gaussian input beam which undergoes diffraction spreading as it propagates through the device. Assuming the initial input beam waist is $\omega_o$, then the beam width at the distance z will be:

$$\omega(z) = \sqrt{\omega_0^2 + \frac{\lambda^2 z^2}{n^2 \omega_0^2 \pi^2}}. \tag{2}$$

The input beam waist which will produce the minimum beam diameter at the distance z can be obtained by setting the derivative ω(z) equal to zero. By doing so we obtain:

$$\omega_{0opt} = \sqrt{\frac{\lambda z}{n\pi}}. \quad (3)$$

Substituting Eq. (3) into Eq. (2), the beam width at z is:

$$\omega_{min}(z) = \sqrt{2}\, \omega_{0opt}. \quad (4)$$

Choosing z=150 mm for the 3-inch diameter LiNbO$_3$ crystal wafer, the optimum input beam waist obtained from Eq. (4) is: $\omega_0 = 0.17$ mm, and the minimum output beam width is $\omega_{min}(L) = 0.24$ mm.

To avoid crosstalk, the adjacent electrooptic gratings have to be located far enough from each other so that the beam diffracted by the first grating misses the second one. Assuming that the switch gratings are located at the top of the beam-splitter gratings with very small gap which can be ignored in comparison to the grating aperture, the shortest distance $\iota_{min}$ between the successive electrooptic gratings is then determined by:

$$l_{min} = \frac{D}{\tan(2\theta_B)}, \quad (5)$$

where D is the grating aperture and $\theta_B$ is the Bragg angle of the electrooptic gratings. If we choose the grating aperture to be 0.5 mm in diameter, then for the minimum-width beam 3.4% of the energy lies outside the grating aperture. Since the beam width is less than $\omega_{min}(L)$ over all of its path, the combined loss and crosstalk will be no greater than −15 dB.

The Bragg diffraction angle $\theta_B$ of a grating is determined by its Period Λ and the wavelength of the light inside the material according to:

$$\theta_B = \sin^{-1}\frac{\lambda}{2n\Lambda}, \quad (6)$$

where λ is the free space light wavelength, and n is the index of refraction of the material. To maximize $\theta_B$, we would like to minimize Λ. The minimum grating period is determined by the fabrication limitations, which for photo-lithographic fabrication is about a 1 μm, and the maximum Bragg angle of the electrooptic grating is about 4.2°.

With the values of the grating aperture and the maximum Bragg angle that we chose, the minimum grating separation was found to be about 3.56 mm.

The relation between the output data rate and the path difference for the structures in FIGS. 2a and 3, and an expression for the switch angle in terms of the path difference and electrooptic grating diffraction angle for the configurations can be derived.

As described before, the tapped delay line is based on the use of spatial path difference to generate temporal pulse sequence. The output pulse frequency is give in terms of the optical path difference between two adjacent channels $\Delta L_o$ by:

$$f = \frac{c}{\Delta L_o}, \quad (7)$$

where c is the speed of light, and the optical path $\Delta L_o = n_{avg}\Delta L_G$. Here $n_{avg}$ is the weighted mode index which must be used since the light will propagate in different directions which have different refractive indexes in a Y-cut LiNbO$_3$ substrate, and $\Delta L_G$ is the geometric path difference. The path difference required to achieve 100 GHz output pulse rate is about 1.36 mm according to Eq. (7). Referring to FIGS. 2a and 3 it is easily seen that the path difference for FIG. 2a is twice the electrooptic grating separation 372. As calculated previously, $\iota_{min} = 3.56$ mm, so the minimum path difference for this structure is therefore about 7.12 mm which is much greater than the value, 1.36 mm, required to achieve a 100 GHz output pulse frequency.

Figure 5A:
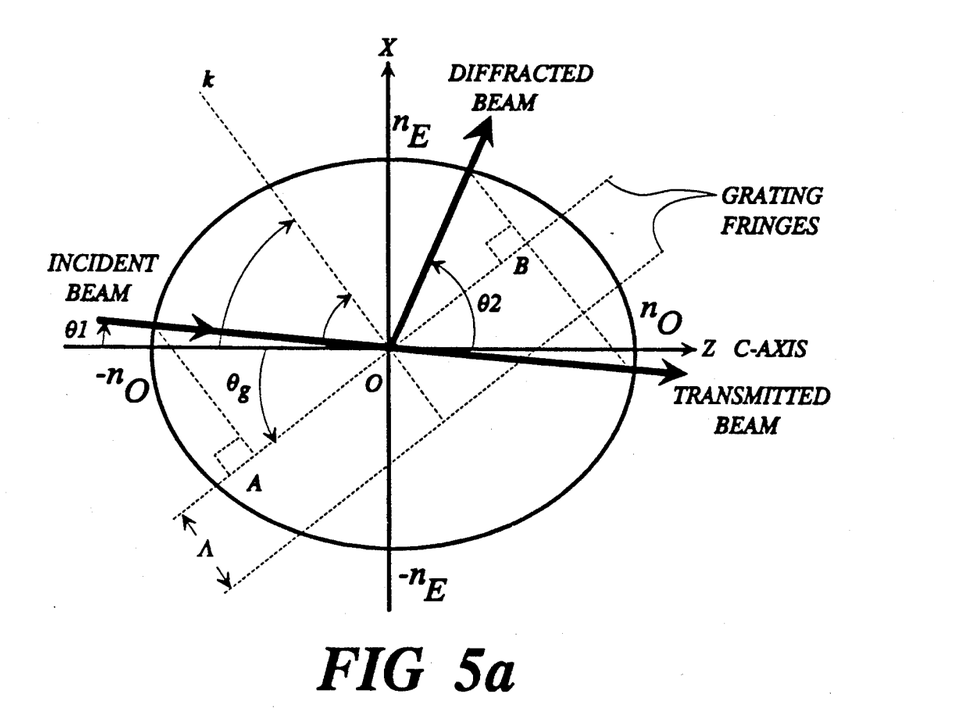
FIG. 5a illustrates the angle $\Xi$.
Figure 5B:
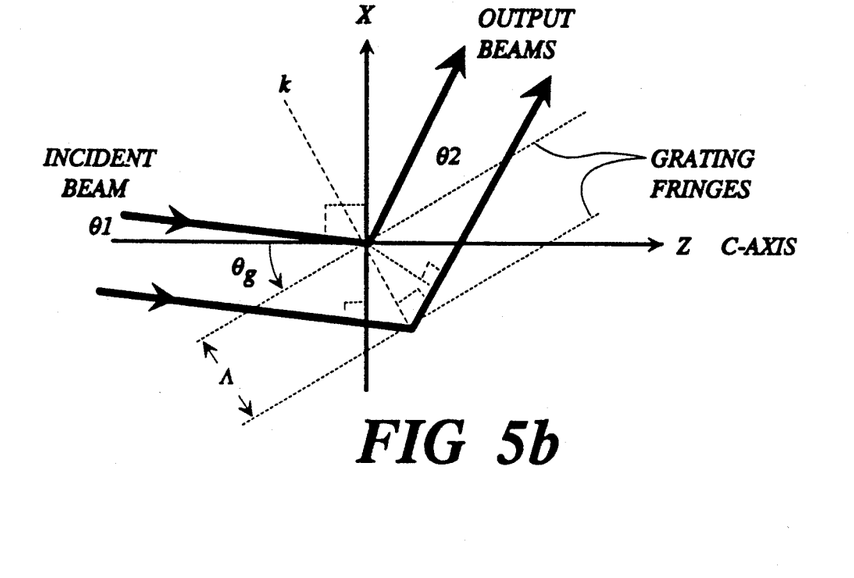
FIG. 5b illustrates the angle $\theta$.

However, the device configuration is shown in FIG. 5 is capable of generating arbitrarily short delays since the path difference in this structure is approximately equal to twice the holographic reflective grating offset $\iota_r$ which can be arbitrarily small. The exact expression for the geometric path difference, ΔLg, in this structure is:

$$\Delta L_G = l_r\left(\frac{1}{\cos\theta_1} + \frac{1}{\cos\theta_2}\right) + l\left(\frac{1}{\cos\theta_1} - \frac{1}{\cos\theta_2}\right), \quad (8)$$

where $\theta_1$ and $\theta_2$ are the angles of the incident and diffracted beams at the switch grating, $\iota_r$ is the reflection grating offset, and $\iota$ is the separation between the beamsplitter gratings. The optical path difference $\Delta L_o$ will be:

$$\Delta L_o = l_r\left(\frac{n_1}{\cos\theta_1} + \frac{n_2}{\cos\theta_2}\right) + l\left(\frac{n_1}{\cos\theta_1} - \frac{n_2}{\cos\theta_2}\right), \quad (9)$$

where, n$_1$ and n$_2$ are the refractive indexes in the direction of $\theta_1$ and $\theta_2$ respectively.

Since 01 and 02 are so small that $\cos\theta_1 = \cos\theta_2 = 1$, the geometric path difference is almost $2\iota_r$. Therefore, according to Eq. (7), $\iota_r$ should be approximately 0.68 mm to generate a 100 GHz output sequence.

Figure 6:
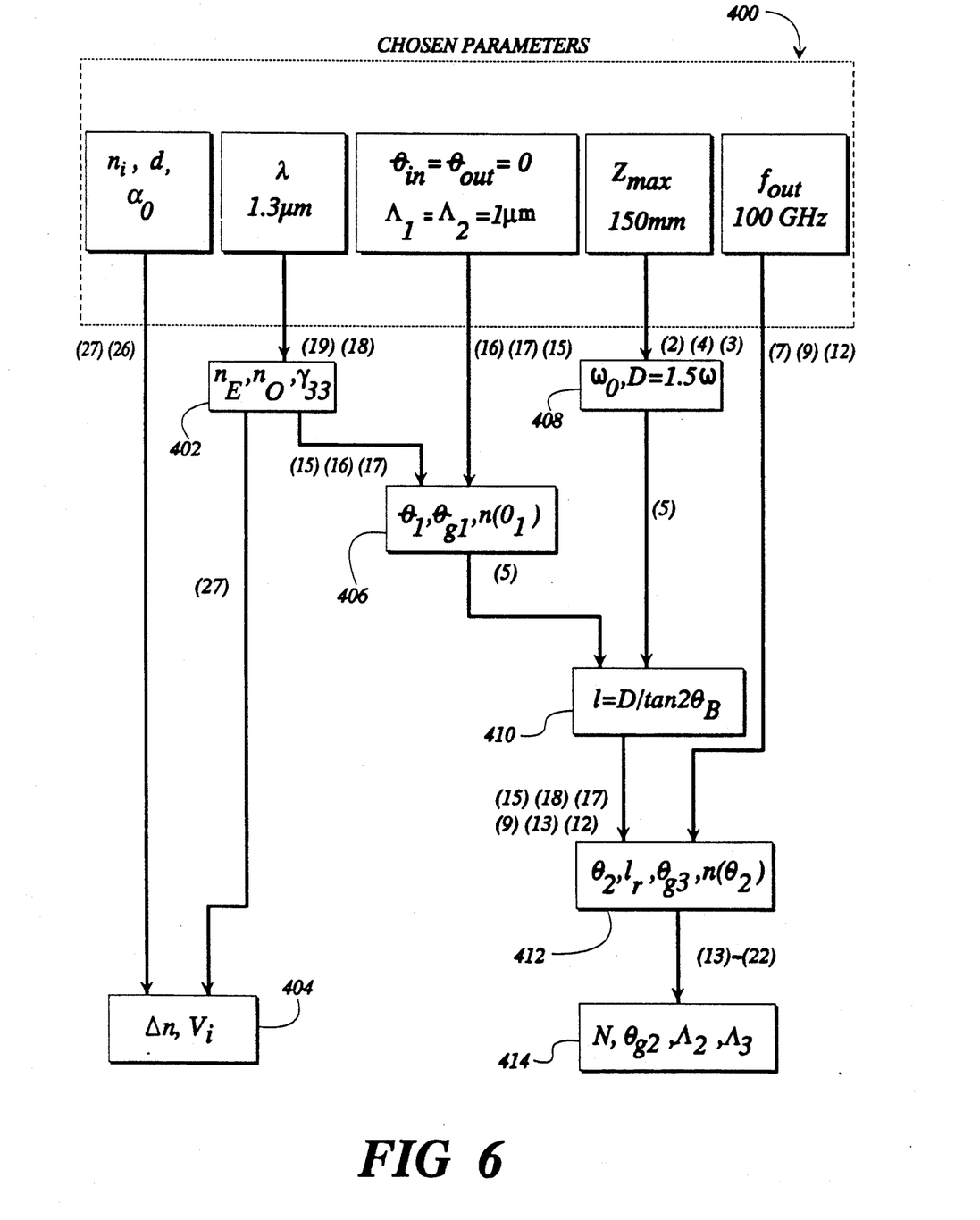
FIG. 6 is a flow chart for the design of the tapped delay line.

In the structure of FIG. 3, for fixed grating periods, $\iota_r$ will be a function of $\theta_2$, the angle between the beam diffracted by the switch gratings and optic axis. Therefore, once the desired path difference is determined by the desired output data rate using Eq. (7), the switch angle will not be an arbitrary value, it is determined by the values of the electrooptic grating separation 1; the diffraction angle $\theta_1$, and the reflection-grating offset $\iota_r$ which is about one half of the path difference. Referring to FIG. 6 the following equations hold for the triangle ABC.

$$AD = (\theta + \theta_r)\tan\iota_1$$

$$AD = (\iota - \iota_r)\tan\theta_2, \quad (10)$$

from which, $$\theta_2 = \tan^{-1}\left[\frac{l + l_r}{l - l_r} \tan\theta_1\right]. \tag{11}$$

Values of $\theta_2$ and $\iota_r$ are obtained from Eqs. (7), (9), and (11). The values of $\theta_1$ and $\theta_2$ will determine the periods and the orientations of the switch and the reflection gratings.

After the diffraction directions of the beam-splitter gratings and switch gratings have been determined, the orientation angle $\theta_{g3}$, which is the angle between the optic c-axis and the normal direction of the holographic grating fingers, is fixed by:

$$\theta_{g3} = \frac{\theta_2}{2} - \frac{\theta_1}{2}. \tag{12}$$

The maximum number of bits that can be accommodated on a single chip is determined by the electrooptic grating separation 1, holographic grating offset $\iota_r$, and the crystal wafer size. The total device lengths, for the configurations in FIGS. 2 and 3 are, respectively, L, 374, $$L = (N-1)\iota + \iota_d + 2\iota_E, \tag{13}$$

$$L = (N-1)(\iota + \iota_r) + \iota_d + 2\iota_E, \tag{14}$$

where $\iota_d$ is the distance between the first holographic grating and the second electrooptic grating for the structure of FIG. 2, and the distance between the first holographic grating and the last electrooptic grating for the structure FIG. 3; $\iota_E$ is the space for a prism coupler, and N is the total channel number. L must be less than 72 mm for a 3-inch LiNbO$_3$ crystal wafer. If we choose $\iota_E = 4$ mm, then at the output frequency of 19 GB/s the maximum channel number is 18 for the structure of FIG. 2a and is 16 for the structure of FIG. 3.

Once all the above parameters; the period, the diffraction angle, and the separation of electrooptic gratings, the diffraction angle of the switch gratings, and the orientation direction of the holographic gratings, have been determined, it is then necessary to trace the path of the diffracted beams from the gratings to determine the orientation angle for the beam-splitter gratings and the switch gratings, and the period for switch and the holographic gratings.

For a grating to operate in the Bragg regime, it is necessary that the parameter $$[\lambda_0^2 / \Lambda^2 n_o \Delta n]$$

exceed 10. For a grating per of 4 mm, an operating wavelength of 1.3 $\mu$m and a nominal index of refraction of 2.2, we see that p exceeds 30 even for values of $\Delta n$ as large as $10^{-3}$. The electrooptic gratings therefore are well in the Bragg regime. In the uniaxial Y-cut LiNbO$_3$ waveguide, the refractive index n is a function of $\theta$, the direction of Propagation with respect to the optical axis. Two conditions must be satisfied for efficient Bragg diffraction.

Figure 7:
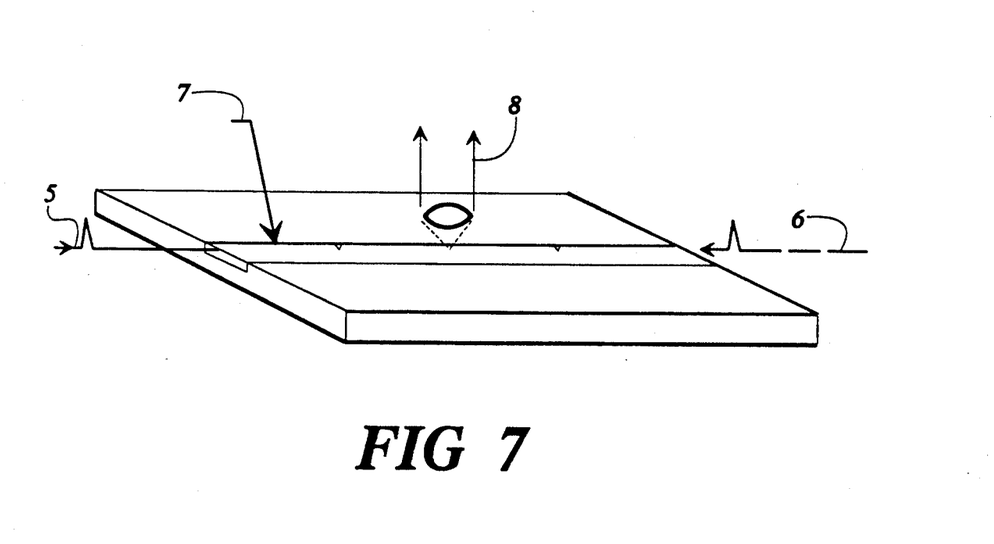
FIG. 7 illustrates the prior art second harmonic generation (SHG)

First, the phase matching condition, or Snell's law, expressed by Eq. (15). Second, the Bragg condition expressed by Eq. (16):

$$n(\theta_1)\sin\theta_1 = n(\theta_2)\sin\theta_2, \tag{15}$$

$$\Lambda\{n(\theta_1)\cos(\theta_1+\theta_g)+n(\theta_2)\cos(\theta_2-\theta_g)\} = \lambda, \tag{16}$$

where $\theta_g$ is the grating orientation angle. Here we define $\theta_g$ to be the angle between grating fingers and the crystal c-axis for transmission gratings, and to be the angle between the normal direction of the grating fingers and the optical c-axis for the reflection gratings. $n(\theta_1)$ and $n(\theta_2)$ are the refractive indices in the incident and diffracted directions, $\theta_1$ and $\theta_2$ are the incident and diffracted angles. These conditions are illustrated in FIG. 7.

For the TE guided mode propagating at an angle $\theta$ to the c-axis in a uniaxial waveguide, the relationship between $n(\theta)$ and $\theta$ is:

$$n(\theta) = \frac{n_o n_E}{(n_o^2 \sin^2\theta + n_E^2 \cos^2\theta)^{\frac{1}{2}}}, \tag{17}$$

where the values of $n_o$ and $n_E$, the ordinary and extraordinary refractive indexes at the wavelength of $\lambda$, are given by:

$$n_o = \sqrt{A_o + \frac{B_o}{D_o - \lambda^2} + C_o\lambda^2}, \tag{18}$$

$$n_E = \sqrt{A_E + \frac{B_E}{D_E - \lambda^2} + C_E\lambda^2}. \tag{19}$$

The values of coefficients $A_o$, $B_o$, $C_o$, $A_E$, $B_E$, $C_E$, and $D_E$ can be obtained in Weber, *Laser Handbook*. vol IV, part 2, pgs. 32–34, CRC Press 1984. At the wavelength of 1.3 $\mu$m, the ordinary and extraordinary refractive indexes for LiNbO$_3$ are $n_o = 2.2197$ and $n_E = 2.1453$ respectively. By inserting the expression for $n(\theta)$ given in Eq. (17) into Eq. (15), the angle between the refracted beam and the c-axis is found to be:

$$\theta_2 = \tan^{-1}\frac{-J \pm (J^2 - 4IK)^{\frac{1}{2}}}{2I}, \tag{20}$$

where $$\begin{cases} I = n(\theta_1)^2 n_o^2 \sin^2\alpha - n_o^2 n_E^2 \cos^2\xi, \\ J = -2n_o^2 n_E^2 \sin\xi\cos\xi, \\ K = n(\theta_1)^2 n_E^2 \sin^2\alpha - n_o^2 n_E^2 \sin^2\xi; \end{cases} \tag{21}$$

and $$\begin{cases} \xi = \frac{\pi}{2} - \theta_g, \\ \alpha = \xi - \theta_1. \end{cases} \tag{22}$$

The angles $\xi$ and $\alpha$ are shown in FIG. 5. In order to make $\theta_1$ and $\theta_2$ satisfy both Eq. (15) and Eq. (16), a proper grating orientation, $\theta_g$, has to be determined.

There are two approaches for two different conditions. First, if the grating period and the input beam direction are chosen, such as the case of the electrooptic beam-splitter gratings, there must be a grating orientation $\theta_g$ which makes the refraction angle $\theta_2$ satisfy the Bragg condition. This refraction angle is the diffraction direction of the electrooptic gratings, and is also the input beam direction of the switch gratings. Second, if the input and diffraction directions are fixed, such as the situation for the switch and holographic gratings, the value of $\theta_g$ which satisfies the input and output direction will determine the period dimension of these gratings. In the first case, the equation which must be solved numerically is:

$$f(\theta_g) = \Delta P(\theta_g) - \lambda = 0, \quad (23)$$

where $\Delta P(\theta g)$ is the path difference introduced by the adjacent finger structures inside the gratings, and can be expressed as:

$$\Delta P(\theta_g) = \Lambda\{n(\theta_1)\cos(\theta_1+\theta_g) + n(\theta_2)\cos(\theta_2-\theta_g)\} \quad (24)$$

In the second case, the equation to be solved is:

$$f(\theta_g) = \theta_2(\theta_g) - \theta_{20} = 1, \quad (25)$$

where $\theta_{20}$ is the desired diffraction direction. The above equations can not be solved analytically after Eqs. (16)-(23) are inserted. To solve for the roots of these equations, Newton's method is employed. The root of Eq. (25) will determine the diffraction direction of the electrooptic beam splitters that gives the input beam direction for the switch gratings and the root of Eq. (26) will determine the period of the switch and reflection gratings.

The diffraction efficiency of an electrooptic grating is:

$$\eta = \sin^2\left(\frac{\pi \Delta n d}{\lambda \cos\theta}\right), \quad (26)$$

where d is the grating thickness, $\theta$ is the incident angle, and $\Delta n$ is the refractive index change caused by the electrooptic effect. If an electric field $E_z$ is applied along the axis z, the refractive index in the z direction will be changed by the amount of:

$$\Delta n = \frac{1}{2} a_o n_E^3 \gamma_{33} E_z, \quad (27)$$

where $33\gamma$ is the largest electrooptic coefficient for LiNbO$_3$, and $\alpha_o$ is the field overlap coefficient. The value of $\alpha_o$, which is about 0.5, was measured experimentally for an 8 μm period electrooptic grating. We estimate $\alpha_o$ to be 0.3 for the 4 μm period electrooptic gratings. The ability to achieve the desired diffraction efficiency by adjusting the value of the applied voltage eliminates the need for precision fabrication since the appropriate voltage for each grating can be determined empirically. If $\Delta n$ is in the order of $10^{-4}$, d is chosen to be 0.7 mm, and the overlap coefficient $\alpha_o$ is 0.3; the voltage needed to get 100% efficiency will be less than 10 volts.

The design procedure for the planar integrated optic tapped delay line just described is summarized in the flow chart of FIG. 6. The parameters in the design flow chart are defined as follows:

$\lambda$: light wavelength.
$\omega$: beam spot size.
l: grating beam-splitter separation.
$l_r$: reflection grating offset.
L: device length.
N: number of bits.
$f_{out}$: output sequence rate.
$\theta_1$: diffraction angle of electrooptic diffraction gratings.
$\theta_2$: diffraction angle of electrooptic switch gratings.
$\theta_{g1}$: electrooptic diffraction grating orientation angle.
$\theta_{g2}$: switch grating orientation angle.
$\theta_{g3}$: reflection grating orientation angle.
$\Lambda_1$: electrooptic diffraction grating period.
$\Lambda_2$: electrooptic switch grating period.
$\Lambda_3$: reflection grating period.
d: grating thickness.
D: grating aperture.
$n_f$: diffraction efficiency of with electrooptic channel.
$V_f$: applied voltage on with electrooptic grating.
z: light propagation path length inside the waveguide.

The first step 400 in designing the tapped delay line is to chose parameters $n_i$, d, $\alpha_o$, $\lambda$, $\theta_{in}$, $\theta_{out}$, $\Lambda_1$, $\Lambda_2$, $Za_{max}$ and $F_{out}$. Using equations 18 and 19 and the value of $\lambda$, the quantities for $n_{86}$, $n_o$ and $\gamma^{33}$ are found in step 402. These results are in turn applied in step 404 to find $\Delta n$ and $V_i$ using equations 26 and 27. Next in step 406 quantities $\theta_1$, $\theta_{g1}$ and $n(\theta_1)$ for $n_{86}$, $n_o$, $\gamma_{33}$, $\theta_{in}$, $\theta_{out}$, $\Lambda_1$, $\Lambda_2$ into equations 15, 16 and 17. In step 408, $\omega_o$ and D are calculated using the value for $Z_{max}$ and equations 2, 3 and 4. The results from step 408 are combined results from step 406 to determine the value of $\iota$ in step 410. The results from step 410 are combined with the value of $f_{out}$ to calculate the values of $\theta_2$, $2_r$, $\theta_{g3}$, and $n(\theta_2)$ using equations 9, 12, 13, 15, 17 and 18. Finally in step 414, values for N, $\theta_{g2}$, $\Lambda_2$ and $\Lambda_3$ are calculated using equations 13-22 and the results from step 412.

Figure 2B:
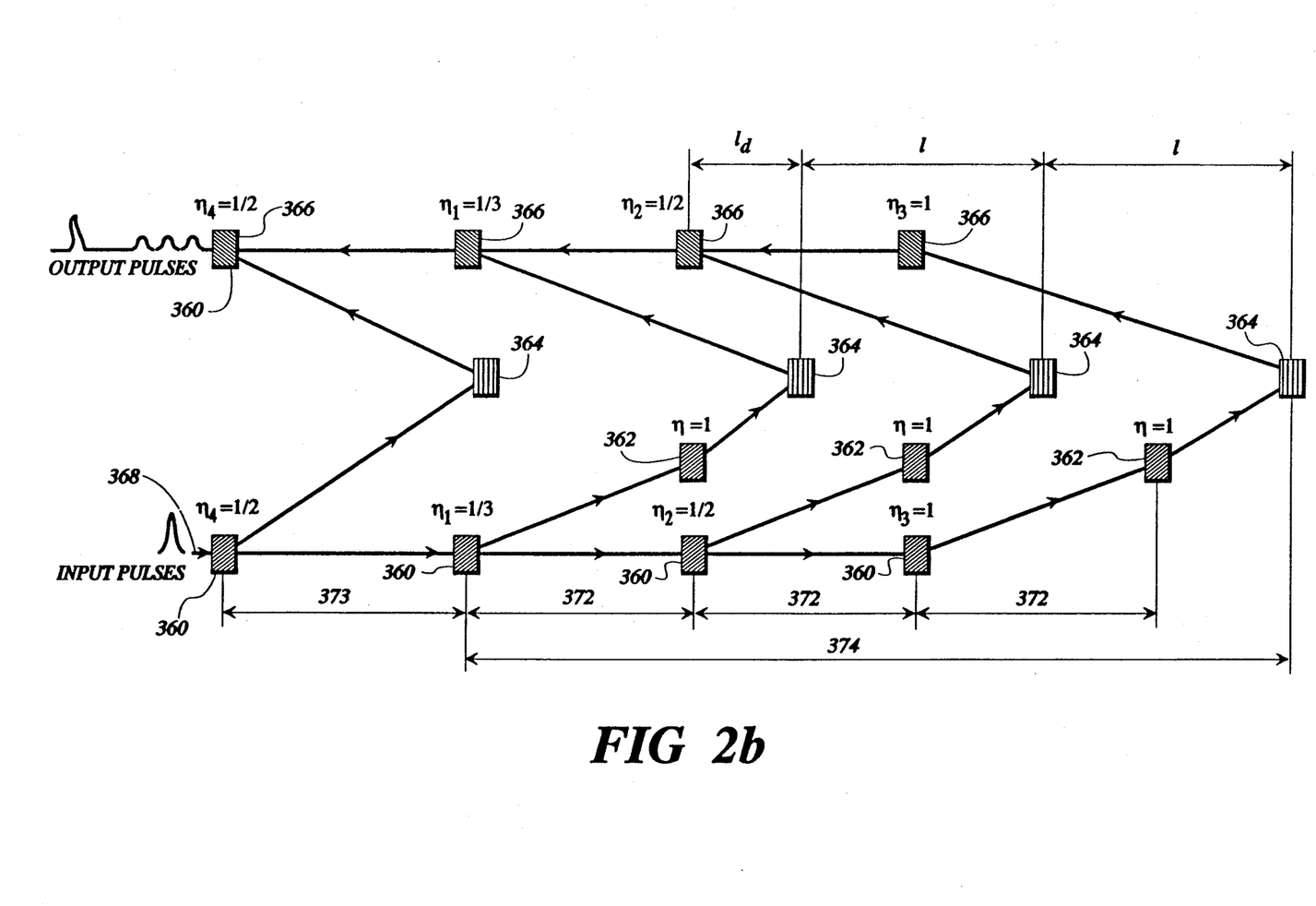

Those skilled in the art will appreciate that the planar integrated optic tapped delay lines of FIGS. 2a and 3 only generate three equally spaced apart data bits, and not the timing pulse. However, these designs can be modified to generated the timing pulse with the understanding that preferably one-half of the energy of the input pulse should be placed in the timing pulse and that the timing pulse should precede or lag the data in time by T, as discussed previously. For example, the tapped delay line of FIG. 2a can be modified as shown in FIG. 2b. The efficiencies of the beam splitter gratings 360 would be set to ($\frac{1}{2}$, $\frac{1}{3}$, $\frac{1}{2}$, 1). Also, the spatial separation of components would be altered to produce the desired time relationship between timing and data pulses. For example, the first beam splitter 360, is spaced 1.5 times the distance between beam splitters used to generate the data pulses.

Those skilled in the art will understand that the tapped delay line of the present invention is not limited to planar designs of FIG. 2a, 2b and 3, for example the tapped delay line may also be of channel construction.

An additional consideration in the design of the tapped delay line is the laser chosen as an optical input source. Any laser chosen must give off easily detectable SHG signals when used with the serial-to-parallel converter of the present invention. To determine the lowest power level that can be used it is first-necessary to characterize the materials used to form the serial-to-parallel converter. The proposed materials were characterized using a commercial modelocked Nd:YAG laser, which generates pulses with peak powers of about 100 Watts, followed by a pulse compressor to shorten the pulse duration from about 120 psec to less than 6 psec. The peak power in this pulse was approximately 4kW if the pulse is compressed to 3 psec.

It can easily be shown that, to maximize the SHG signal, the tapped delay line should be designed so that half of the power in the initial pulse is put into the timing pulse, the remainder being split equally among the data pulses. Using this algorithm it can be shown that, for example, for a 16-bit code having four ones, the output of the code generator should be $I_T=I_o/9$ and $I_D=I_o/36$, where $I_T$, $I_D$, and $I_o$ indicate intensity of the timing pulse, the data pulse and the input pulse, respectively. The sum of the output intensities, $(2/9)I_o$ is less than the input intensity because of intrinsic beam-combining losses. I assume an additional 10 dB of signal degradation due to excess loss in the code generator and to coupling losses. Pulse powers entering the SHG device are therefore taken to be $I_T=44$ W and $I_D=11$ W.

The second harmonic signal intensity can be expressed as $$P(2\omega) = DNL(L/W)P_D P_T \text{ Watts}$$

where DNL is the second harmonic intensity factor in units of Watts-1, $P_D$ and $P_T$ are the data and timing pulse powers, respectively, L is the length of the interaction region, and W is the width of the interaction region. In the above equation the effects of waveguide losses in the SHG device have been neglected.

Using the above pulse powers the following table can be generated to compare the SHG capabilities of two waveguides; Ti-indiffused LiNbO3 and, MNA (2-methyl-4-nitroaniline) on glass.

TABLE 1

| Comparison of SHG Capability of LiNbO3 and MNA | | |
|---|---|---|
| Waveguide | Ti:LiNbO3 | MNA:Glass |
| Index of refraction (film/substrate) | 2.155/2.146 | 1.7515/1.4462 |
| Pulse overlap (Lμm) (3 psec pulses) | 418 | 514 |
| Channel width (Wμm) | 3 | 3 |
| Waveguide depth (dμm) | 2.8 | 0.5 |
| DNL (Watts-1) | $1.8 \times 10^{-11}$ | $9.4 \times 10^{-6}$ |
| $P_{SHG}$ (Watts) | $1.3 \times 10^{-6}$ | 0.8 |

As seen in the table, the expected output from an uncoated LiNbO3 SHG device is expected to be in the microwatt range and coating with a high-index layer should increase this number by almost three orders of magnitude. The output, even from the uncoated LiNbO3 device, should be detectable with a conventional fast PIN diode and should be easily seen using the Tektronix CSA 803 communication signal analyzer.

The result calculated for single-crystal MNA, some five orders of magnitude larger than the LiNbO3 result, provides significant motivation for working with this material even though we expect that the SHG power will be reduced from the single-crystal value when the material is incorporated into a polymer for convenience in fabricating waveguides.

FIG. 7 shows prior art second harmonic generation (SHG). Normandin and Stegeman demonstrated waveguide SHG by injecting a probe pulse 5 and a signal pulse 6 into opposite ends of a strongly nonlinear optical waveguide to generate a second harmonic output 8.

Figures 8, 9A:
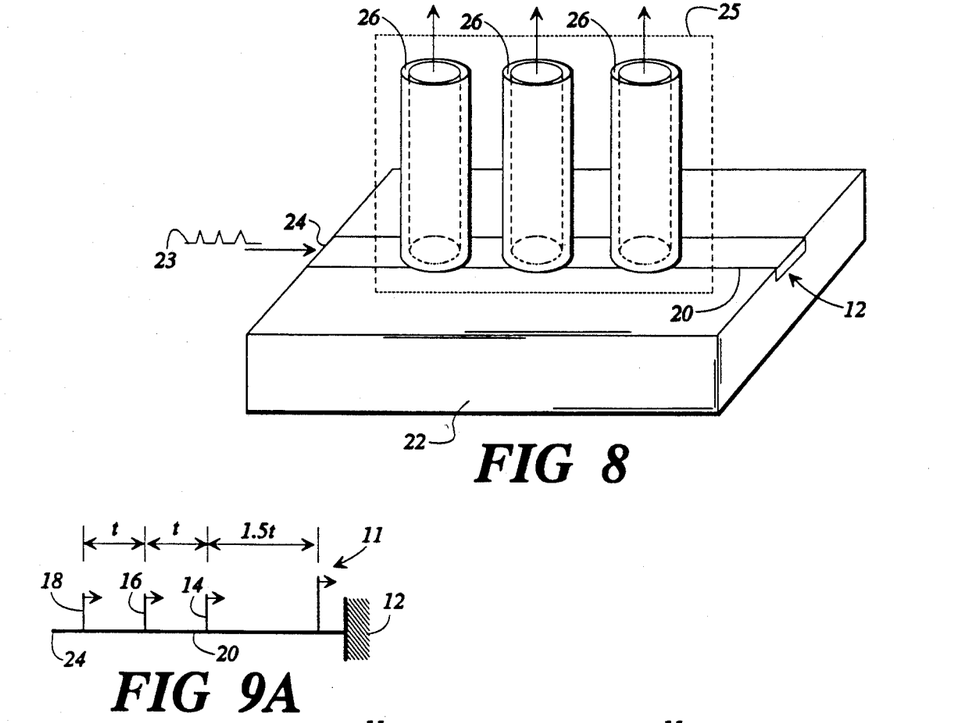
FIG. 8 illustrates an optical serial-to-parallel converter of the present invention.
FIG. 9a shows a timing pulse propagating ahead of a data pulse stream.

Turning now to FIG. 8, an optical serial-to-parallel converter 10 of the Present invention may be seen. The serial-to-parallel converter 10 includes a channel waveguide 20 supported by a block of material 22. While a channel waveguide 20 is preferred because it allows high power efficiency over the entire length of the device, the present invention may also be practiced with a planar waveguide.

The waveguide 20 may be made of a ferro-electric material, such as lithium niobate or any other strongly non-linear material. By strongly non-linear, I mean a material whose non-linearity is on the order of or greater than that of lithium niobate (LiNbO3). Other suitable materials include gallium arsenide (GaAs), gallium aluminum arsenide (GaAlAs) and other semiconductor materials. Alternately, strongly non-linear organic materials may be used for the waveguide, examples of which include polydiacetylene or MNA, (2-methyl-4-nitroaniline).

When using a channel waveguide 20 such as that shown in FIG. 8, it is preferred that the channel be thinner in depth than in width, the strength of the second harmonic being a decreasing oscilliatory function of the waveguide depth. However, if the channel is too small, it may lose some of its ability to retain the optical data pulses and lose efficiency. Channel dimensions of $1 \times 10$ μm are adequate.

One end 12 of the waveguide 20 is mirrored so that any optical pulse incident upon it will be reflected. A data stream 23 is injected into waveguide 20 through waveguide input 24. SHG occurs when a previously injected pulse is reflected and while counter-propagating collides with a subsequently injected Pulse.

In these figures, timing pulse 11 is shown preceding data pulses 14, 16 and 18 into channel 20, however the serial-to-parallel converter of the present invention will also function if timing pulse 11 lags the data pulses.

A fiber array 25 detects the SHG collisions as they occur. The number of bits contained in the frame in the serial data stream 23 determines the number of optical fibers 26 needed in array 25. The fiber array 25 is placed above and perpendicular to the longitudinal axis of waveguide 20. One end of each optical fiber 26 of array 25 adjoins waveguide 20. The location of each fiber with respect to the mirrored end 12 is dictated by the location where each data pulse collides with the counter-propagating timing pulse 11, as will be discussed in detail hereinbelow. The far end of each fiber 26 is connected to a detector, which converts the optical data back into electronic data.

Turning now to FIG. 9, timing diagrams for the serial-to-parallel converter of the present invention may be seen. Data pulses 14, 16 and 18 are separated from each other in time by t. The series of pulses 14, 16, and 18 represent one frame of a series of frames in a data stream or a specific 3-bit binary code. The timing pulse preferably is 180° out of phase from the data pulses. Thus, in the preferred embodiment, timing pulse 11 precedes the first data pulse 14 by a time 1.5 t, though any time which satisfies the equation for T below will do.

$$T = (n + \tfrac{1}{2})t$$

where:

T = the time by which the timing pulse precedes the first data pulse into the channel;
t = the time between adjacent data Pulses in the data pulse stream; and
n = any integer ( . . . −1,0,1,2 . . . ).

In these figures, timing pulse 11 is shown preceding data pulses into the channel, however the serial-to-parallel converter of the present invention will also function if the timing pulse lags the data pulses.

Figure 9B:
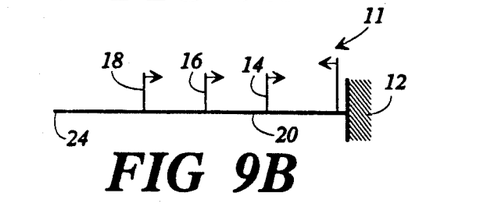
FIG. 9b shows the timing pulse counter-propagating towards the data pulse stream.
Figure 9C:
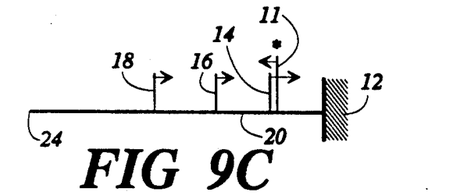
FIG. 9c shows the collision and generation of a second harmonic by the collision of the timing pulse with the first data bit in the data pulse stream.

Upon reflection at mirrored end 12, timing pulse 11 counter-propagates toward the first data pulse 14. As can be seen in FIG. 9c, SHG occurs when timing pulse 11 collides with first data pulse 14, with the second harmonic wave propagating perpendicular to the longitudinal axis of waveguide 20. This second harmonic is detected by an appropriately placed optic fiber 26.

Figure 9D:
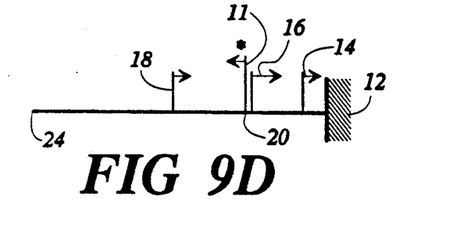
FIG. 9d shows the generation of second harmonics by the collision of the data pulse with the second bit in the data pulse stream.

Timing pulse 11 continues to counter-propagate from waveguide 20 and eventually collides with the second data pulse 16, as can be seen in FIG. 9d. Once again, second harmonic generation occurs, though at a different location in waveguide 20 from the previous collision.

Figure 9E:
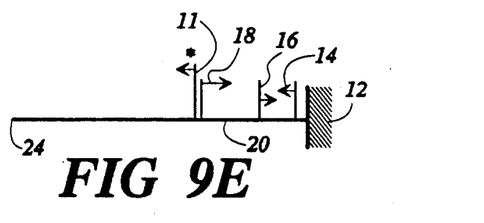
FIG. 9e illustrates the second harmonic generation by the collision of the timing pulse with the third data pulse.

As can be seen in FIG. 9e, counter-propagate timing pulse 11 eventually collides with the third data bit or pulse 18. Again, a third channel of data may be demultiplexed from the serial data stream by appropriately placing yet another optic fiber 26 above waveguide 20. The precise location in the channel 20 where timing pulse-data pulse collisions occur is given is determined by the geometry of the optical tapped delay line used to generate the pulse sequence. This also determines the proper placement of each optic fiber.

Figure 9F:
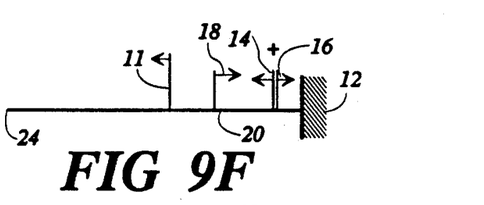
FIG. 9f shows the collision of the counter-propagating first data pulse with the second data pulse.

FIG. 9f shows the collision between the first data pulse 14, now counter-propagating through waveguide 20, and data pulse 16. As can be seen, this collision occurs in a different location than the locations of timing pulse-data pulse collisions because the timing pulse has been injected into the data stream out of phase with the bit rate in the data stream 23. Thus, SHG caused by data pulse-data pulse collisions will not cause any interference with the second harmonics generated by the timing pulse-data pulse collisions.

Figure 9G:
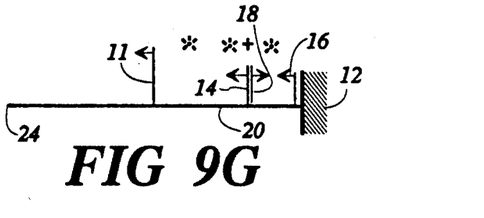
FIG. 9g shows the collision of the counter-propagating first data bit with the third data pulse.

FIG. 9g also shows a collision between data pulse 14 and data pulse 18. Again, the collision occurs at a location distinct from any of the data pulse-timing pulse collisions, and thus does not cause any interference with the serial-to-parallel conversion. The location of each data pulse-data pulse collision is determined by the geometry of the optical tapped delay line used to generate the pulse sequence.

The consequence of the positioning of the timing pulse is that there is spatial separation of the desired second harmonic due to the timing pulse-data pulse collisions and the undesired second harmonic due to collisions among the data Pulses. Since the relative positions of the pulses are determined during the sequence generation process, the output can be collected by a properly positioned linear fiber optic array 25. It is now seen that this invention provides a technique for using optical second harmonic generation for converting a high-rate optical serial bit stream into a set of Parallel bit streams each of which has a data rate which is slow enough to be handled by high-speed detectors and subsequent electronic components.

Figure 10:
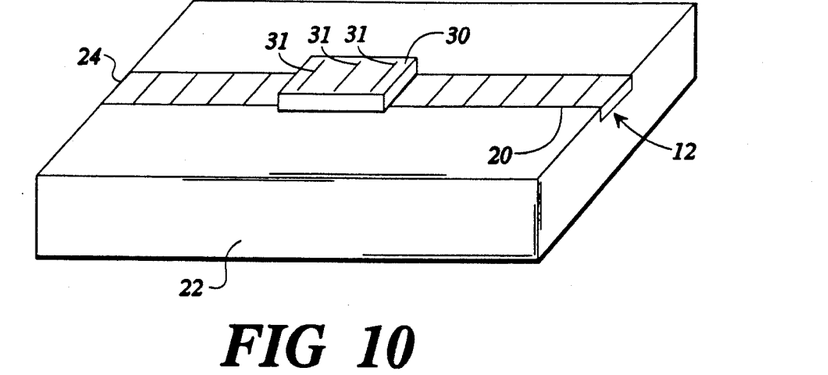
FIG. 10 illustrates an alternative embodiment of the series-to-parallel converter of the present invention using a photodetector array.

As shown in FIG. 10, an array of photodetectors 30 may be used in place of fiber optic array 25. As with the fiber optic array 25, the placement of the array of photodetectors 25 is dependent upon location of generation of second harmonics resulting from the timing pulse-data pulse collisions for the binary code. The output of each photodector is an electrical signal received from an electrical output 31.

Where the input data pulses 14, 16, 18 comprise a data frame constituting one epoch of a series of time domain multiplexed (TDM) bit sequences, then pulses 14, 16, 18 may be demultiplexed by means of appropriately spaced parallel output channels. The output from the parallel output channels can be in the form of either optical signals from optical array 25 or electrical signals from photodetector array 30 as an electrical signal, received from an electrical output 31.

Figure 11:
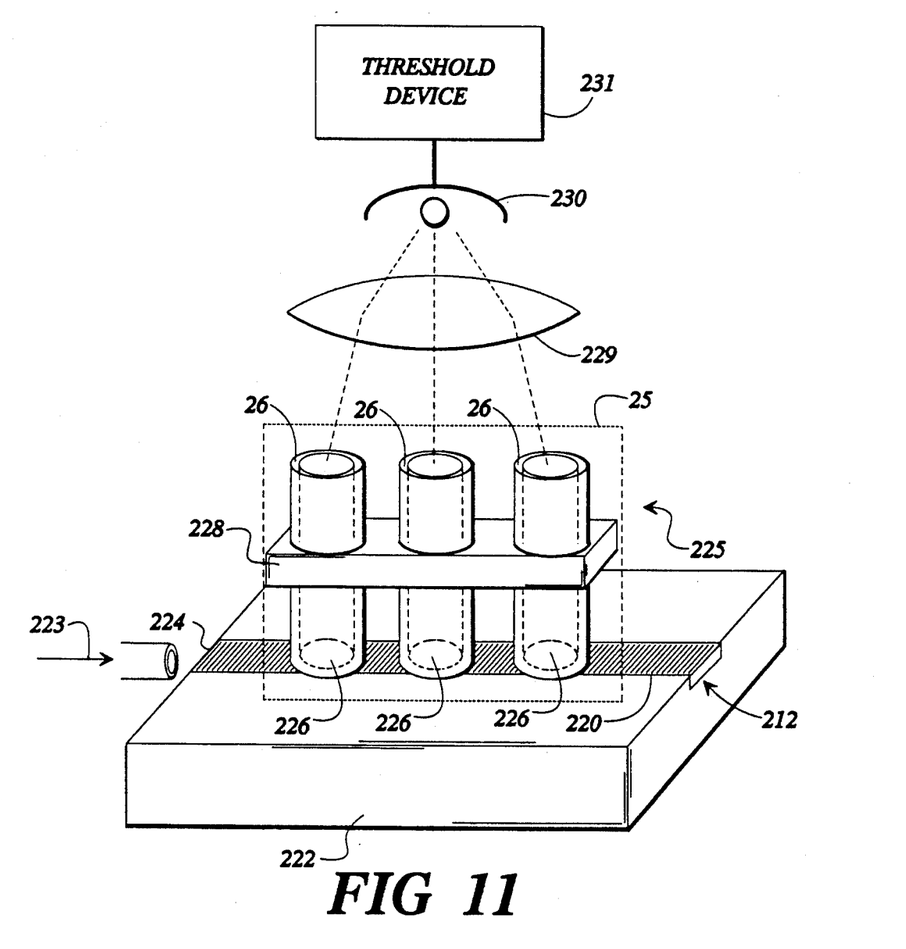
FIG. 11 illustrates an apparatus for performing optical code recognition.

Turning now to FIG. 11, application of the apparatus of the present invention for performing optical code recognition may be seen. The channel waveguide 220 has an input waveguide 224 and a mirrored reflecting end 212. Adjoining the channel 220, and extending perpendicular thereto, is an array of optical fibers each of which passes through a fiber-optic switch 228, which switch can either block or pass the second harmonic output of the channel 220 to a common detector 230. The switches 228 may be mechanical shutters, which would be programmed manually, or electrooptic switches which are controlled electrically. In either case, a switch is programmed high by opening it, thereby allowing light to pass, and is programmed low by closing it and preventing light from passing through to the lens. The switches 228 are programmed according to the N-bit code word $C_N$ before the signal word $S_N$ arrives at the serial-to-parallel converter.

The switches pass their outputs to lens 229 which combines and spatially integrates the parallel optical outputs into a single optical signal. The lens output is fed to an integrating detector 230, which in turn passes its output to an electronic threshold device 231.

It is easily demonstrated that the output of the detector 230 is a maximum when the code word, $C_N$, and the signal word, $S_N$, are identical. Assume that $C_N=[1010]$. For $S_N=[1100]$ the cross product of $C_N$ and $S_N=[1000]$, which when integrated equals 1. When $S_N=[1010]$ then the cross product$=[1010]$, which equals 2 when integrated. What happens when $S_N=[1111]$? The cross product of $C_N$ and $S_N$ also equals $[1010]$ just as when $C_N=S_N$. The serial to parallel converter of the present invention cannot distinguish between these two $D_{N}$s, therefore it is a requirement of the present invention that each signal word may have no more high bits than the code word, $C_N$.

When the detector 230 output is a maximum, threshold detector 231 fires, indicating electrically system recognition of the code word. Threshold detector 231 and detector 230 both operate at the frame rate, rather than the data bit rate, because they need respond only to the cross product of $C_N$ and $S_N$, and not to each bit.

It will be obvious to those skilled in the art that many variations may be made in the embodiments chosen for the purpose of illustrating the best mode of making and operating the present invention, without departing from the scope of the appended claims.

I claim:

1. A method of performing optical serial-to-parallel conversion of an optical data pulse stream having a multiplicity of data pulse, comprising the steps of:
   formatting the data pulse stream into a series of data pulses and an associated timing pulse which is out of phase with the data pulses;
   propagating the data pulses along a forward path;
   counter-propagating and colliding the timing pulse with each data pulse in the data pulse stream thereby producing second harmonic generation from the collision; and
   collecting pulses travelling generally perpendicularly to the forward path at plurality of locations along the forward path.

2. The method of claim 1 wherein the timing Pulse precedes the data pulse stream.

3. The method of claim 1 wherein the timing pulse lags the data pulse stream.

4. The method of claim 1 wherein the timing pulse is 180° out of phase with the data pulse stream.

5. The method of claim 1 wherein the data pulses in the data pulse stream are equally spaced apart.

6. The method of claim 1 wherein the relationship between the timing pulse and the data pulse stream is given by:

$$T=(n+\tfrac{1}{2})t$$

wherein:
n = any integer;
t = the time between adjacent data pulses in the data pulse stream; and
T = the time by which the timing pulse precedes or lags the data pulse stream.

7. An apparatus for converting an optical serial data pulse stream having a multiplicity of data pulses and a timing pulse associated with the data pulses into optical parallel pulse streams, comprising;
an optical waveguide of non-linear material, the waveguide having an input end and a mirrored end opposite the input end; and
a fiber array having a plurality of fiber for collecting optical parallel pulse streams resulting from second harmonic radiation generated by colliding the timing pulse against each data pulse in the data pulse stream within the waveguide, wherein one end of each fiber is positioned adjacent the waveguide and extends substantially perpendicularly therefrom, the distance of each fiber from the mirrored end of the waveguide determined substantially by the velocity of light and a temporal relationship between the timing pulse and the data pulses.

8. The apparatus of claim 7 wherein the timing pulse is out of phase with the data pulses.

9. The apparatus of claim 8 wherein the timing pulse is 180° out of phase with the data pulses.

10. The apparatus of claim 7 wherein the data pulses in the data pulse stream are equally spaced apart.

11. The apparatus of claim 7 wherein the temporal relationship between the timing pulse and the data pulses is given by:

$$T=(n+\tfrac{1}{2})t$$

where
t = the spacing between data pulses in the data stream
n = any integer
T = the time by which the timing pulse precedes or lags the data pulse stream.

12. The apparatus of claim 7 further comprising a multiplicity of detectors each associated with an output and of said fibers for producing electrical outputs in response to the optical signals.

13. The apparatus of claim 7 wherein the apparatus is embodied as a channel device.

14. The apparatus of claim 7 wherein the apparatus is embodied as a planar device.

15. A method of optical code recognition, comprising the steps of:
programming an array of optical switches according an N-bit code word $C_N$;
receiving an N-bit signal word $S_N$ with an associated timing in a waveguide having a mirrored end;
reflecting at the mirrored end whichever of the timing pulse or $S_N$ is first received in the waveguide;
counter-propagating the first received signal;
colliding the timing pulse with $S_N$ thereby producing second harmonic generation;
detecting the second harmonics generated from the collision of the timing pulse and $S_N$;
determining the cross product of $C_N$ and $S_N$ from the second harmonics; and
recognizing the optical code when a scalar product of $C_N$ and $S_N$ is at least a given threshold value.

16. The method of claim 15 wherein the timing pulse is out of phase with $S_N$.

17. The method of claim 16 wherein the timing pulse is 180° out of phase wi $S_N$.

18. The method of claim 16 wherein the timing pulse precedes $S_N$ in time.

19. The method of claim 16 wherein the timing pulse lags $S_N$ in time.

20. The method of claim 15 wherein the relationship between the timing pulse and $S_N$ is given by:

$$T=(n+\tfrac{1}{2})t$$

where
t = the time between adjacent bits in signal word $S_N$
n = any integer
T = the time by which the timing word precedes or lags $S_N$.

21. An apparatus for optical code recognition, comprising:
a nonlinear optical waveguide having a mirrored end and an input end for receiving an N-bit signal word, $S_N$, where $S_N$ includes a timing pulse;
an array of optical fibers adjacent to and extending from the waveguide for detecting second harmonics;
a programmable optical switch array programmed according to an N-bit signal word, $C_N$, the switch array having a plurality of switches for blocking or passing harmonics generated between $S_N$ and the timing pulse;
an integrating detector for outputting a scalar product of $C_N$ and $S_N$; and
a thresholding device for recognizing the code when the scalar product is at least a given threshold value.

22. The apparatus of claim 21 wherein the integrating detector performs both spatial and temporal integration.

23. The apparatus of claim 22 wherein the integrating detector comprises a lens and an electrooptical detector.

24. An apparatus for converting an optical serial data pulse stream having a multiplicity of data pulses and a timing pulse associated with the data pulses into optical parallel pulse streams, comprising;
an optical waveguide of non-linear material, the waveguide having an input end and a mirrored end opposite the input end; and
a collector array means having a plurality of collector elements for collecting optical parallel pulse streams resulting from second harmonic radiation generated by colliding the timing pulse against each data pulse in the data pulse stream within the waveguide, wherein one end of each collector element is positioned adjacent the waveguide and extends substantially perpendicularly therefrom, the distance of each collector element from the mirrored end of the waveguide determined substantially by the velocity of light and a temporal relationship between the timing pulse and the data pulses.

25. An apparatus as claimed in claim 24 wherein said collector array means comprises an array of fibers and an array of detectors associated with said fibers.

* * * * *